(12) United States Patent
Stefan

(10) Patent No.: US 12,314,392 B2
(45) Date of Patent: May 27, 2025

(54) STACKED MALWARE DETECTOR FOR MOBILE PLATFORMS

(71) Applicant: Bitdefender IPR Management Ltd., Nicosia (CY)

(72) Inventor: Tudor Stefan, Deva (RO)

(73) Assignee: Bitdefender IPR Management Ltd., Nicosia (CY)

( * ) Notice: Subject to any disclaimer, the term of this patent is extended or adjusted under 35 U.S.C. 154(b) by 241 days.

(21) Appl. No.: 18/049,654

(22) Filed: Oct. 26, 2022

(65) Prior Publication Data

US 2024/0143760 A1 May 2, 2024

(51) Int. Cl.
*G06F 21/00* (2013.01)
*G06F 21/56* (2013.01)

(52) U.S. Cl.
CPC .......... *G06F 21/566* (2013.01); *G06F 21/562* (2013.01); *G06F 2221/033* (2013.01)

(58) Field of Classification Search
CPC ................ G06F 21/566; G06F 21/562; G06F 2221/033; G06F 21/56
See application file for complete search history.

(56) References Cited

U.S. PATENT DOCUMENTS

| | | | |
|---|---|---|---|
| 9,117,077 B2 * | 8/2015 | Mircescu | G06F 21/577 |
| 9,998,484 B1 | 6/2018 | Buyukkayhan | |
| 10,122,742 B1 * | 11/2018 | Oprea | H04L 63/1425 |
| 10,187,401 B2 | 1/2019 | Machlica et al. | |
| 10,264,009 B2 | 4/2019 | Smyth et al. | |
| 10,366,233 B1 | 7/2019 | Feinman | |
| 11,223,543 B1 | 1/2022 | Fauber et al. | |
| 2003/0159090 A1 * | 8/2003 | Wray | G06F 21/56 714/38.1 |
| 2010/0235916 A1 * | 9/2010 | Radatti | G06F 21/56 714/811 |
| 2016/0321453 A1 * | 11/2016 | Yang | G06F 21/562 |
| 2018/0285740 A1 * | 10/2018 | Smyth | G06N 3/084 |
| 2019/0378022 A1 | 12/2019 | Wang et al. | |
| 2020/0045063 A1 * | 2/2020 | Zhang | H04L 63/1416 |
| 2020/0089650 A1 | 3/2020 | Sharma et al. | |

(Continued)

OTHER PUBLICATIONS

Dzeroski et al., "Is Combining Classifiers with Stacking Better than Selecting the Best One?" Machine Learning vol. 54, pp. 255-273, Mar. 2004.

(Continued)

*Primary Examiner* — Michael M Lee
(74) *Attorney, Agent, or Firm* — Law Office of Andrei D Popovici, PC

(57) ABSTRACT

Described systems and methods protect electronic devices such as smartphones and IoT devices against malicious software. In some embodiments, a malware detector comprises a stack/cascade of feature processors configured to determine a set of derived feature values according to primary features characterizing software executing on the respective device, and further comprises a synthesizer module configured to determine whether the client device comprises malware according to the derived feature values. When a derived feature value is currently unavailable or cannot be computed, some embodiments supply a surrogate value to replace the missing derived feature value, thus ensuring that the malware detector can always produce a verdict.

21 Claims, 7 Drawing Sheets

(56) References Cited

U.S. PATENT DOCUMENTS

| | | | |
|---|---|---|---|
| 2020/0125728 A1 | 4/2020 | Savir et al. | |
| 2020/0320438 A1 | 10/2020 | Lin et al. | |
| 2020/0364338 A1 | 11/2020 | Ducau | |
| 2021/0021631 A1 | 1/2021 | Okutan et al. | |
| 2021/0105303 A1* | 4/2021 | Povey | H04L 9/0819 |
| 2021/0112095 A1 | 4/2021 | Bruss et al. | |
| 2021/0133323 A1* | 5/2021 | Shin | G06F 21/554 |
| 2021/0157914 A1 | 5/2021 | Gauthier et al. | |
| 2021/0240827 A1 | 8/2021 | Kim et al. | |
| 2021/0406707 A1 | 12/2021 | Resnick et al. | |
| 2022/0019659 A1 | 1/2022 | Salem et al. | |
| 2022/0030018 A1 | 1/2022 | Jeyakumar et al. | |
| 2022/0083659 A1* | 3/2022 | Ma | G06F 21/563 |
| 2022/0083910 A1 | 3/2022 | Tomoda | |
| 2022/0147628 A1* | 5/2022 | Abu Alhaol | G06N 3/045 |
| 2022/0147815 A1 | 5/2022 | Conwell et al. | |
| 2022/0179948 A1 | 6/2022 | Prudkovskiy | |

OTHER PUBLICATIONS

Emmanuel et al., "A survey on missing data in machine learning," Journal of Big Data, vol. 8, pp. 140, Oct. 2021.
Khan et al., "Bootstrapping and Multiple Imputation Ensemble Approaches for Classification Problems," ArXiv: 1802.00154v5, Oct. 2019.
European Patent Office (EPO), International Search Report and Written Opinion mailed Jan. 26, 2024 for PCT International Application No. PCT/EP2023/079686, International Filing Date Oct. 24, 2023, Priority Date Oct. 26, 2022.

* cited by examiner

STACKED MALWARE DETECTOR FOR MOBILE PLATFORMS

BACKGROUND

The invention relates to computer security, and in particular to protecting users and devices against malicious software.

Malicious software, also known as malware, affects a great number of computer systems worldwide. In its many forms such as computer viruses, spyware, and ransomware, malware presents a serious risk to millions of computer users, making them vulnerable to fraud, loss of data and sensitive information, identity theft, and loss of productivity, among others. The explosive growth in mobile computing has only exacerbated computer security risks, with millions of devices such as smartphones and tablet computers constantly connected to the Internet and acting as potential targets for malware. In particular, on mobile platforms, malware may masquerade as bona-fide applications including games, news, and messaging platforms, thus tricking unsuspecting users into installing them. In some cases, the user may be completely unaware of any malicious activities happening under the hood of an apparently legit and entertaining interface.

Conventional methods of protecting against malware include executing security software on the respective devices. Detection methods typically include static analysis wherein target software is compared to a library of malware-indicative 'code signatures', and behavioral analysis wherein the security software monitors the target software for indications of malicious behavior. In response to detecting a malicious agent, security software may quarantine or prevent its further execution. Due to recent developments in artificial intelligence (AI) and machine learning (ML), some modern malware detectors currently rely on various flavors of artificial neural networks pre-trained on corpora of known malicious and clean samples. In a typical example, a neural network receives a vector of feature values characterizing a target software entity and outputs a label indicating whether the respective target software is malicious.

However, such AI approaches face substantial technical challenges. One example is the choice of input features. Typically there are no obvious or universal criteria for choosing which features of target software are more likely to reveal malice and/or to differentiate between malicious and benign behavior. Mobile computing platforms (smartphones, wearables, etc.) and Internet of Things (IoT) devices show substantially more variability in terms of hardware and software than personal computers. Therefore, it may be difficult to find malware-indicative features that work reliably across such a heterogeneous collection of devices. Furthermore, some features may not be reliable indicators of malice because the same software application may behave differently on distinct devices, depending on local operating system settings and permissions granted on each device.

Other reasons for software applications to show device-specific behavior are deliberate attempts by sophisticated malware to evade countermeasures. For instance, some malware refrains from malware-indicative behavior for extended periods of time, tricking security software into classifying it as benign. Some malware may tailor its behavior according to a type of device (e.g. smartphone vs. tablet, one manufacturer or model vs. another), a type of operating system, a current geographical location of the respective device, etc. Some malware further selects its victims by searching the respective device for indicators of a user's worth to the attacker. For instance, malware may determine what other software is currently installed on the respective device, and search for specific applications such as banking, social media, etc. Other malware may monitor a user's pattern of accessing various applications, online resources, etc. Such malware may then launch an attack only on carefully selected devices and/or against carefully selected users, when the respective attack is seen as more likely to pay off.

Another challenge facing AI-implemented antimalware solutions is the availability of the input features. Stated otherwise, even when a relevant feature set is known, some of the respective features may not be available at all times and/or on all client devices. This is particularly true for mobile computing platforms such as smartphones and wearables, among others, wherein extracting or evaluating certain features may require specific permissions from the user. Furthermore, extracting or evaluating some features may be relatively expensive in terms of computation, which may unacceptably alter the user experience especially on mobile platforms which typically have much fewer computational resources than personal computers and servers.

To address the feature selection and availability problems, some conventional approaches increase the count of features and therefore the size of AI models in an attempt to improve their performance. However, large neural networks are notoriously costly to implement and train in terms of computation and typically require large training corpora which are difficult to acquire, annotate, and maintain.

For all the reasons outlined above, there is a considerable ongoing effort and a sustained interest in developing robust and scalable computer security systems and methods capable of quickly and efficiently responding to emerging threats against mobile computing platforms.

SUMMARY

According to one aspect, a malware detection method comprises employing at least one hardware processor of a computer system to execute a plurality of feature processors configured to determine a plurality of derived feature values according to a plurality of primary feature values characterizing a software entity executing on the computer system, wherein a selected feature processor is configured to determine a selected derived feature value according to a selected subset of the plurality of primary feature values. The method further comprises, in response to executing the plurality of feature processors, determining whether the selected derived feature value is missing, and if yes, supplying a surrogate value to replace the missing selected derived feature value. The method further comprises employing at least one hardware processor of the computer system to determine whether the software entity is malicious according to derived feature values determined by the plurality of feature processors and further according to the surrogate feature value.

According to another aspect, a computer system comprises at least one hardware processor configured to execute a plurality of feature processors, a data substitution module, and a synthesizer module. The plurality of feature processors are configured to determine a plurality of derived feature values according to a plurality of primary feature values characterizing a software entity executing on the computer system, wherein a selected feature processor is configured to determine a selected derived feature value according to a selected subset of the plurality of primary feature values. The data substitution module is configured to determine whether the selected derived feature value is missing, and if yes, to supply a surrogate value to replace the missing selected derived feature value. The synthesizer module is configured to determine whether the software entity is malicious according to derived feature values determined by the plurality of feature processors and further according to the surrogate feature value.

According to another aspect, a non-transitory computer-readable medium stores instructions which, when executed by at least one hardware processor of a computer system, cause the computer system to form a plurality of feature processors, a data substitution module, and a synthesizer module. The plurality of feature processors are configured to determine a plurality of derived feature values according to a plurality of primary feature values characterizing a software entity executing on the computer system, wherein a selected feature processor is configured to determine a selected derived feature value according to a selected subset of the plurality of primary feature values. The data substitution module is configured to determine whether the selected derived feature value is missing, and if yes, to supply a surrogate value to replace the missing selected derived feature value. The synthesizer module is configured to determine whether the software entity is malicious according to derived feature values determined by the plurality of feature processors and further according to the surrogate feature value.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized collection of data. A hash is the numerical result of applying a hash function to a token (e.g., character string, code snippet, etc.). Hash functions map data of arbitrary size to fixed-size values. Exemplary hashing functions/procedures include, among others, cyclic redundancy check (CRC), checksums, message digest functions (e.g., MD5), and secure hash algorithms (SHA). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
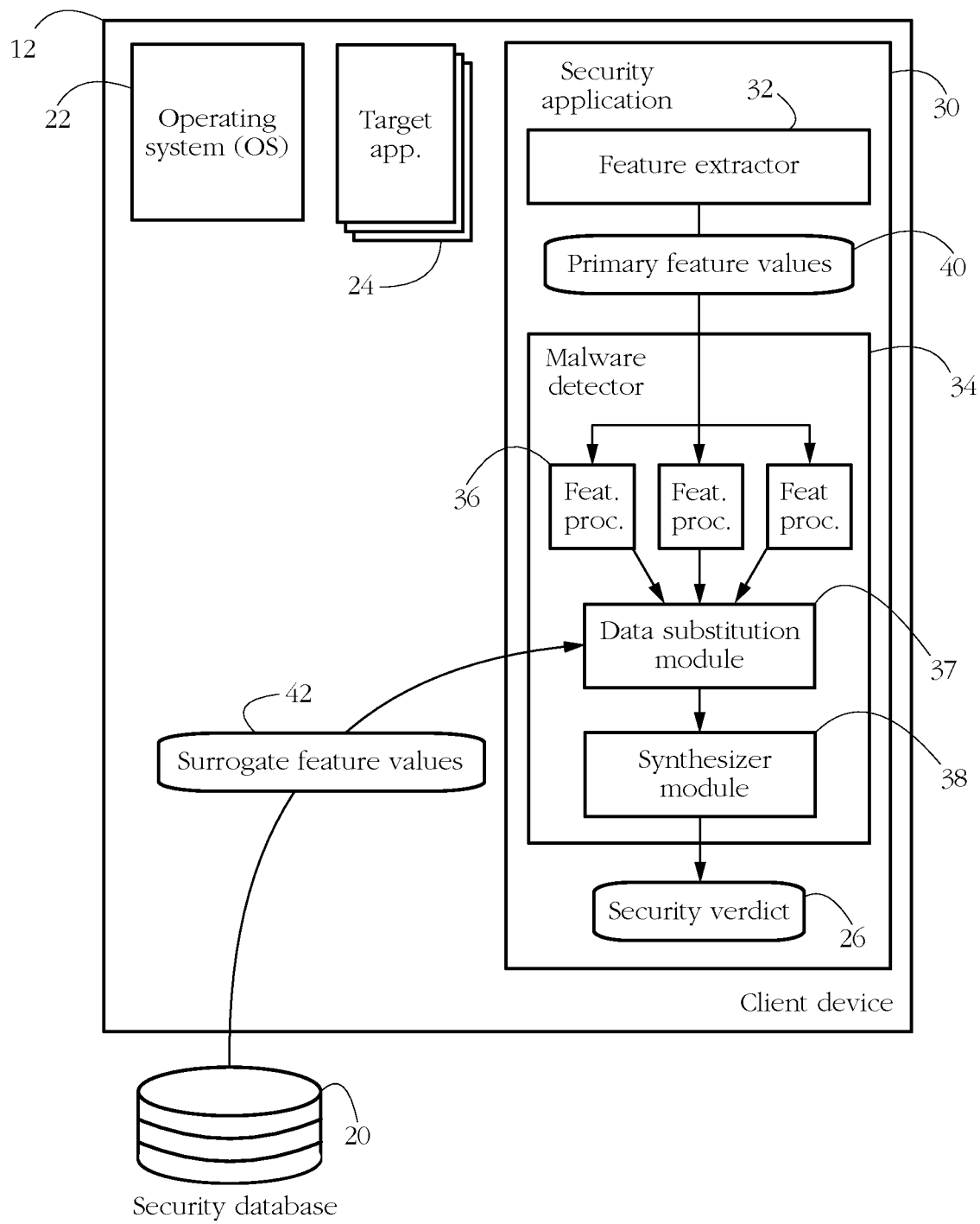
FIG. 1 shows exemplary software executing on a client device, including a security application protecting the client device against malware according to some embodiments of the present invention.

FIG. 1 shows an exemplary client device 12 protected against malware according to some embodiments of the present invention. Client device 12 generically represents any electronic device having a processor, a memory, and a communication interface enabling the respective device to communicate with other devices/computer systems. Exemplary client devices 12 include personal computers, mobile computing platforms (e.g., laptop computers, tablets, mobile telephones, and wearable devices such as smartwatches and fitness bands, among others), entertainment devices (e.g., TVs, game consoles), and household appliances (e.g., refrigerators, washing machines), among others.

In some embodiments, client device 12 executes a plurality of computer programs, such as an operating system (OS) 22 providing an interface between the hardware of client device 12 and other computer programs such as a set of target applications 24 executing on the respective client device. Exemplary operating systems include, among others, Windows®, MacOS®, iOS®, and Android®.

Target application(s) 24 generically represents any software such as word processing, image processing, spreadsheet, calendar, gaming, social media, web browser, and electronic communication applications, among others. The term 'application' herein denotes a standalone, executable piece of software distinct from the operating system, and which may be invoked by a user independently of other applications (as opposed to, for instance, a software library or a subroutine forming a part of another computer program). Exemplary applications 24 include smartphone apps downloaded from a store such as the App Store by Apple®, Inc. or Google® Play®, or other third-party applications installed by the user (e.g. APK files directly downloaded by the user from the Internet and installed on client device 12). The modifier 'target' is included merely for clarity, to indicate that application(s) 24 form(s) the object of a security analysis (malware detection) as described herein. For instance, a malware detector as described herein may be configured to determine whether target application 24 comprises malware.

In some embodiments, a security application 30 is configured to protect client device 12 and its user against computer security threats such as malicious software. For clarity, the following description will focus on embodiments wherein security application 30 comprises software executing on at least one hardware processor of client system 12. However, a skilled artisan will understand that in alternative embodiments, the described functionality may be implemented in hardware (e.g., a dedicated integrated circuit forming part of device 12) or in a combination of hardware and software. Security application 30 may form a part of a larger software suite which may provide various security services such as a traffic filter, virtual private networking (VPN), anti-spam, parental control, etc.

In some embodiments, security application 30 further includes a feature extractor 32 and a malware detector 34 communicatively coupled to feature extractor 32. Feature extractor module 32 is configured to characterize various software entities executing on the respective client device (e.g., target apps 24) by evaluating a set of features/attributes of such software. Features evaluated by extractor 32 are herein deemed 'primary' merely because they serve as input to a first stage of a stacked malware detector as described below. The modifier 'primary' is not meant to indicate a relative importance or relevance of some features with respect to others.

Primary features herein refer broadly to any attribute known in the art of computer security, that can be used to determine whether client device 12 comprises malicious software. Some such features may not be malware indicative per se, but may indicate malice when co-occurring with other features. Exemplary primary features include so-called 'static' features such as a current content of a section of memory, a content of a file or folder (e.g., an Android® manifest file), a current OS setting, a content of an OS registry, a text displayed to a user, various features of an image displayed on a screen of client device 12, etc. Other static features include an indicator of whether a memory of client system 12 currently stores a specific piece of code/sequence of instructions commonly known in the art as a malware signature. Other examples of primary features include behavioral or so-called 'dynamic' features indicating whether a particular software entity has performed a specific action, such as opening a file, changing an access permission, launching a child process, injecting code into another software entity, sending an electronic communication (e.g., an HTTP request for a remote resource), etc.

The operation of feature extractor 32 may include any methods and algorithms known in the art of computer security. Evaluating static features may include signature matching by way of hashing or other methods, accessing OS-specific data structures such as a Windows® registry to read current values of various settings, etc. Evaluating dynamic features may include detecting an occurrence of a hardware or software event such as an application install, uninstall, and update, process/application launches and terminations, the spawning of child processes (e.g., forking), dynamic loading/unloading of a library, execution of a particular processor instruction (e.g., system call), file events such as file creation, write, deletion, etc., and setting various OS parameters (e.g., Windows® registry events, permission/privilege changes), among others. Other exemplary detected events include a requests to access a peripheral device (e.g., hard disk, SD card, network adapter, microphone, camera), a request to access a remote resource (e.g., a hypertext transfer protocol— HTTP request to access a particular URL, an attempt to access a document repository over a local network), a request formulated in a particular uniform resource identifier scheme (e.g., a mailto: or a ftp: request), and an attempt to send an electronic message (e.g., email, short message service— SMS, etc.), among others. Yet other exemplary events comprise moving a user interface/window of target application 24 in and/or out of focus/foreground.

Some embodiments may further detect various timing-related events, such as periods of inactivity, i.e., time gaps between events and/or time intervals when the respective client device is idle, registers no user activity, or carries out only internal system tasks. Such inactive periods may be further differentiated into short time gaps (e.g., of the order of a seconds) and long time gaps (e.g., of the order of minutes to hours). Other timing-related events may include, for instance, a sequence of events occurring in quick succession/bursts of activity.

Other exemplary detected events may comprise receiving and/or displaying a particular type of content, such as a SMS including a hyperlink, an HTML document including a login form, a payment interface, an advertisement, etc.

Exemplary events specific to, or particularly relevant to the security of, mobile devices include screen toggles (on/off), a change in the label/name/icon of an application, and a screen grab. Other examples include a request to grant a specific type of permission (e.g., admin, accessibility), permissions requested dynamically (i.e., during various stages of execution, as opposed to at installation), and granting persistency (e.g., a foreground service started dynamically by the respective application). Yet other examples include an attempt to prevent an uninstall of the respective application and displaying an overlay on top of an OS settings interface (such an overlay may trick an unsuspecting user into granting the respective application unwanted permissions).

Event detection may be device-type-specific. In one example wherein client device 12 is a personal or laptop computer, upon detecting the launch of target application 24, feature extractor 32 registers the respective application and/or its associated processes with an event logging service of OS 22 (e.g., event tracking for Windows®—ETW, Syslog in UNIX®). In response, extractor 32 may receive notifications of various events occurring during execution of the respective processes, either in real time or in log form. Event logging tools typically generate a list of event descriptors including a timestamp for each event, a numerical code identifying an event type, an indicator of a type of process or application that generated the respective event, and other event parameters. In such embodiments, extractor 32 may detect the occurrence of a target event by parsing the respective event log.

In another example of event detection, feature extractor 32 may modify a set of native functions of OS 22 by inserting redirecting instructions (also known as hooks or patches). In this manner, when a process executing on client device 12 calls the respective OS function, execution is redirected to a callback routine notifying extractor 32 of an attempt to execute the respective OS function. When the hooked function is instrumental in a monitored event (e.g., file creation, process launch, etc.), an attempt to call the respective function may serve as an indicator of the occurrence of the respective event.

In yet another example of event detection, electronic communications sent by the respective client device may be detected by installing a proxy module configured to intercept domain name service (DNS) queries and/or HTTP requests transmitted by the respective client device.

Some operating systems such as those executing on smartphones, wearables, etc., may not allow such manipulations. However, other tools may be available to detect the occurrence of various events. For instance, some OSs expose an application programming interface (API) that enables registering callbacks for different notifications, inspecting network traffic, SMS/MMS manipulation, detecting access to storage devices (e.g., SD card), etc. Some embodiments of feature extractor 32 use functions of an accessibility API to access on-screen content and detect user interactions with the respective device and/or applications. Some embodiments may further use artificial intelligence (e.g., natural language processing, computer vision, etc.) or other means of analyzing a content displayed on screen.

In some embodiments, feature extractor 32 produces a plurality of primary feature values 40, i.e., current values of a plurality of features/attributes characterizing software executing on client device 12 (e.g., target application 24). Such values may be numerical, strings, Boolean, etc., depending on the type of the respective feature. In typical embodiments, the count of primary features is relatively large, e.g., in the hundreds or thousands, but the present description applies in general to any number of primary features.

In some embodiments, security application 30 further includes a malware detector 34 receiving primary feature values 40 as input and determining a security verdict 26 according to feature values 40, verdict 26 indicating whether client device 12 comprises malicious software. Exemplary verdicts 26 include a Boolean label (e.g., YES/NO) and a likelihood that the respective client is infected. Verdict 26 may further include an identifier of a software entity deemed malicious (e.g., target application 24), an identifier of a malicious agent or type of malware, and a set of instructions for mitigating the effects of the respective infection.

Figure 2:
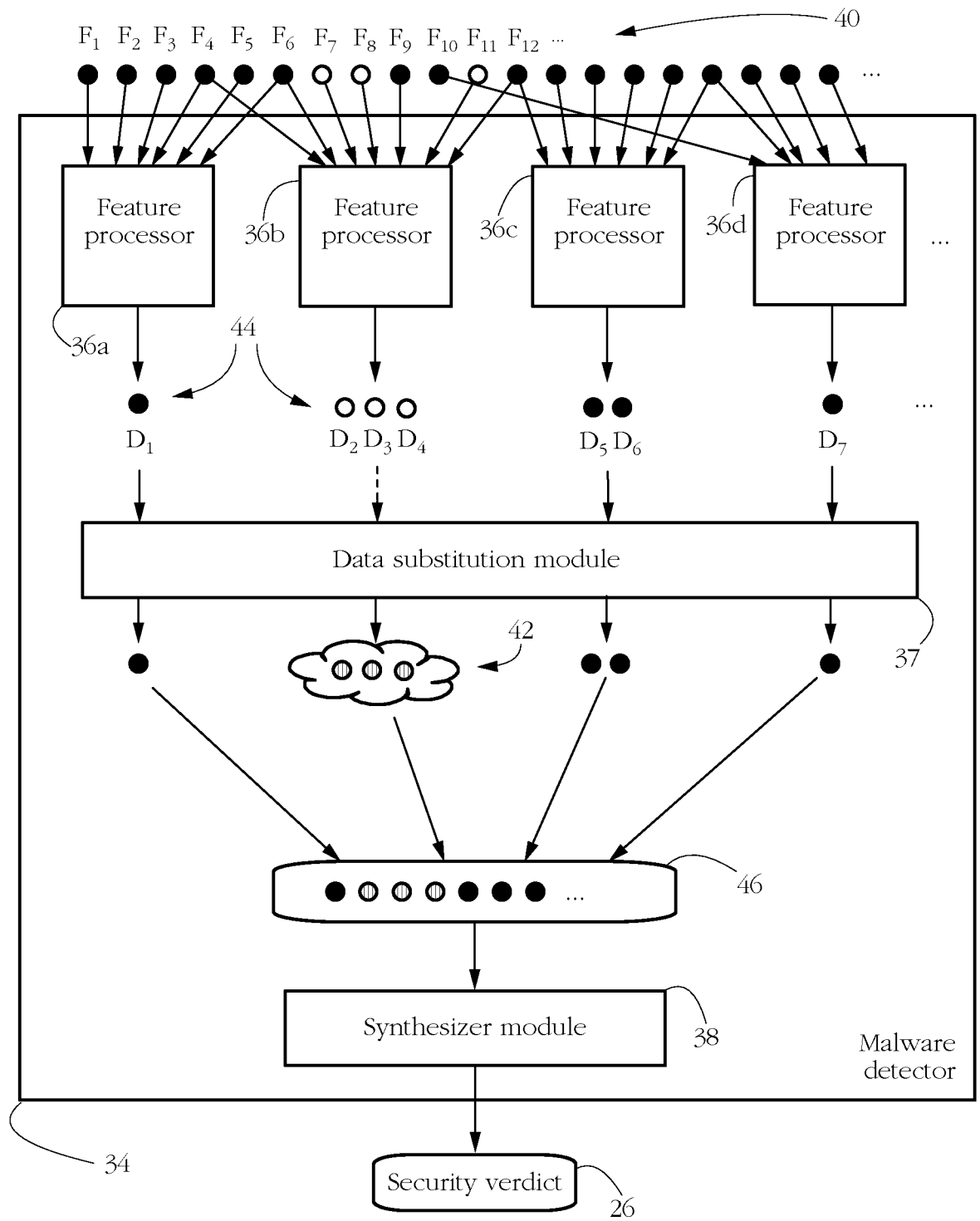
FIG. 2 illustrates an exemplary structure and operation of a malware detector according to some embodiments of the present invention.

FIG. 2 illustrates an exemplary structure and operation of a malware detector 34 according to some embodiments of the present invention. Detector 34 has a stacked or cascade-like architecture, wherein a plurality of feature processors (FP) 36a-d receive primary feature values 40 determined by feature extractor 32 and output a plurality of derived feature values 44 determined according to primary feature values 40. The derived feature values then serve as input to a second-level synthesizer module 38 which in turn determines security verdict 26 according to derived feature values 44. When some derived feature values 44 are missing (could not be determined for any reason), a data substitution module 37 fills in the missing values with surrogate data 42, as detailed below. Although FIG. 2 shows just two levels of feature processing, a skilled artisan will know that the present description applies in general to a malware detector comprising a stack of feature processor levels, wherein each level receives the output of the previous level and feeds its own output to the next level of feature processors. For a description of such multi-level architectures, please see below in relation to FIG. 8.

In some embodiments, each primary feature processor 36a-d inputs a specific subset of feature values 40, i.e., values of a specific subset of features. Stated otherwise, each FP 36a-d analyzes software executing on client device 12 through the perspective of a selected subset of features. In the example illustrated in FIG. 2, FP 36a considers only primary features $F_1$ through $F_6$, while FP 36b only processes primary features $F_4$, $F_6$, $F_7$ through $F_9$, $F_{11}$ and $F_{12}$. This aspect however is not meant to be limiting, for instance some FPs may input the whole range of features. The subsets of features analyzed by each FP 36a-d may overlap as in the exemplary embodiment to illustrated in FIG. 2, wherein both FPs 36a and 36b use features $F_4$ and $F_6$.

Each feature processor 36a-d computes a specific set of derived feature values 44 according to its respective input. In the example of FIG. 2, FP 36a determines derived feature $D_1$ according to current values of primary features $F_1$ through $F_6$. Derived features 44 may include any feature characterizing software executing on client device 12 (e.g., target application 24). In one exemplary embodiment, each FP 36a-d outputs a derived feature value indicating a probability that client device 12 comprises malware. In such examples, even though all feature processors 36a-d output the same kind of information, i.e., a partial security verdict, each such partial verdict may be determined according to a distinct subset of primary features.

In some embodiments, each FP 36a-d embodies a distinct malware-detecting algorithm, procedure, etc. Exemplary FPs 36a-d may implement various malware-detection heuristics, such as signature matching and decision trees, among others. Other exemplary FPs 36a-d may implement automated classifiers based on clustering algorithms (e.g., k-means, k-nearest neighbors, etc.), statistical techniques (e.g., Bayesian methods, etc.), support vector machines (SVMs), and/or Markov models. Some classes/clusters may be associated with benign behavior, while others may be associated with malware. In embodiments using artificial intelligence (AI) technologies, some FPs 36a-d may comprise artificial neural networks (NN) pre-trained to determine whether a client device comprises malware according to a specific subset of features. Some such NNs may be trained to detect specific malware types (e.g., ransomware, malware that steals banking or credit card details, packed/encrypted malware, etc.).

Several NN architectures, as well as strategies for training NNs as malware detectors are known in the art. Simple FP examples include feed-forward networks trained to determine a malware-indicative label according to a subset of primary feature values. Another exemplary class of FPs, known as an autoencoder, can be trained to perform lossy compression and subsequent recovery of a subset of primary feature values. Some embodiments may train the autoencoder on data obtained during execution of benign software, and use a mismatch between the input and output of the autoencoder as an indicator of anomalous and therefore possibly malicious application behavior. Some FPs 36a-d may employ neural networks specialized in text and natural language processing to analyze features extracted from Android® manifest files and/or user interfaces. Such FPs may implement recurrent neural networks (RNN), long short term memory (LSTM) architectures, etc. Other exemplary FPs 36a-d may employ NNs specialized in image processing (such as convolutional neural networks, among others) to analyze screen snapshots and/or image files received or sent out by the respective client device. Specific architectural and functional details of such NN-based feature processors go beyond the scope of the present description.

In yet another exemplary embodiment, some FPs 36a-d may compute a projection of a subset of primary features into an abstract vector space, the projection commonly known as an embedding. Taking the illustrative example of FIG. 2, derived feature values $D_2$, $D_3$, and $D_4$ may be coordinates of a point in an abstract three-dimensional embedding space, the respective coordinates determined according to current values of primary features $F_4$, $F_6$, $F_7$, $F_8$, $F_9$, $F_{11}$ and $F_{12}$ by way of a specific mathematical transformation. The respective embedding space may be constructed via a machine learning procedure wherein parameters of the respective feature processor/neural network are tuned to satisfy pre-determined goals, such as minimizing a cost function determined according to an input and an output of the respective FP. An exemplary embedding space may be one in which all instances of malware are clustered together.

In some embodiments, synthesizer module 38 is configured to receive an input array 46 of derived feature values computed by feature processors 36a-d and to determine security verdict 26 according to the respective derived feature values. Module 38 may implement any malware-detection or decision method known in the art. In a simple example wherein each derived feature value 44 indicates a partial verdict/likelihood of malice, module 38 may determine a consolidated security verdict as a weighted sum of individual derived feature values 44. Each weight may reflect a specific degree of relevance of, or confidence in, each respective partial verdict. Another example of synthesizer module 38 implements a decision tree, wherein each node tests a condition according to a subset of derived feature values 44. In more complex examples, synthesizer module 38 may include a set of pre-trained neural networks configured to map input array 46 to a malware-indicative label or a number indicating a likelihood that device 12 comprises malware. The architecture of such an AI module may depend on the type of input, i.e., on the type of features $D_i$ evaluated by feature processors upstream.

Not all primary feature values 40 may be available, for various reasons. For instance, evaluating some primary features may require specific OS settings or permissions, which may not be currently activated on the respective client device. Some primary feature values may not be computable at all times, in all geographical locations, on all carrier networks, etc. Evaluating some features may require a working Internet connection, which may be currently unavailable. Evaluating some primary features may require additional software which may not be installed on the respective device. Some primary features may be particularly expensive to evaluate and therefore some embodiments may postpone evaluation of such features for periods of relatively low user activity, for pre-determined time intervals, etc. In FIG. 2, primary feature values 40 which are available are represented as filled circles, while feature values currently unavailable are represented as empty circles. For instance, current values of features $F_1$ and $F_9$ are available, while features $F_7$ and $F_{11}$ could not be evaluated and therefore the respective feature values are missing.

In some embodiments, feature processors whose input is incomplete or unavailable do not execute or do not produce valid output. In the exemplary embodiment in FIG. 2, values of derived features $D_2$, $D_3$, and $D_4$ are not available because primary features $F_7$, $F_8$, and $F_{11}$ could not be evaluated. Similarly, the value of derived feature $D_7$ is missing because one of the primary feature values going into feature processor 36d is currently not available. Some FPs may fail to execute for other reasons, for instance because of the occasional error, exception, or crash. In another example, the execution of some FPs (e.g., an FP that is particularly demanding on computing resources) may be suspended or postponed so as to not affect user experience. A missing/not available feature value may be programmatically represented using any method known in the art, for instance as NULL, N/A, NaN, a specific error code, etc.

In some embodiments, when some of the input of synthesizer module 38 is not available, data substitution module 37 replaces the missing derived feature values with surrogate values 42 to within array 46. Filling in the missing input thus ensures that synthesizer module 38 can execute and produce verdict 26 even when some individual feature processors are not functional. In such situations, synthesizer module 38 determines security verdict 26 according to the available derived feature values 44 and further according to surrogate feature values 42 supplied by module 37.

Surrogate values 42 are represented as hatched circles in FIG. 2. The term 'surrogate' herein indicates that the respective value is not determined by the local instance of the respective feature processor according to locally computed primary feature values, but is instead supplied from an alternative source. In some embodiments, data substitution module 37 selectively retrieves surrogate values 42 from a repository illustrated as security database 20 in FIG. 1. Database 20 may reside on computer-readable media forming a part of, or communicatively coupled to, client device 12. Alternatively, some embodiments may retrieve surrogate values from a remote security server, as further detailed below.

In some embodiments, surrogate values 42 are deliberately chosen to be representative for the current circumstances and/or state of client device 12. Therefore, some embodiments of database 20 may store a multitude of reference values for each derived feature, each reference value associated with an identifier of the respective derived feature and further associated with a state indicator indicative of a state of a device that produced the respective reference value. Exemplary state indicators may include, among others, an indicator of a device type (e.g., smartphone of a specific make and model), an indicator of a type and version of an operating system, a timestamp indicating a moment in time when the respective value was computed, a location indicator (e.g., geolocation, network address, etc.), and a set of identifiers (e.g., integrity hashes) of software applications installed and/or executing at the time the respective feature value was computed. Other exemplary state indicators may include primary feature values used in determining the respective surrogate value. In one exemplary embodiment, database 20 stores a collection of records, each record comprising a reference value and a set of metadata indicative of a device state. Database 20 and individual records may use any format and data structure known in the art that enables selectively retrieving surrogate values 42 according to a device state. More to details on computing and/or harvesting surrogate feature values are given below.

Figure 3:
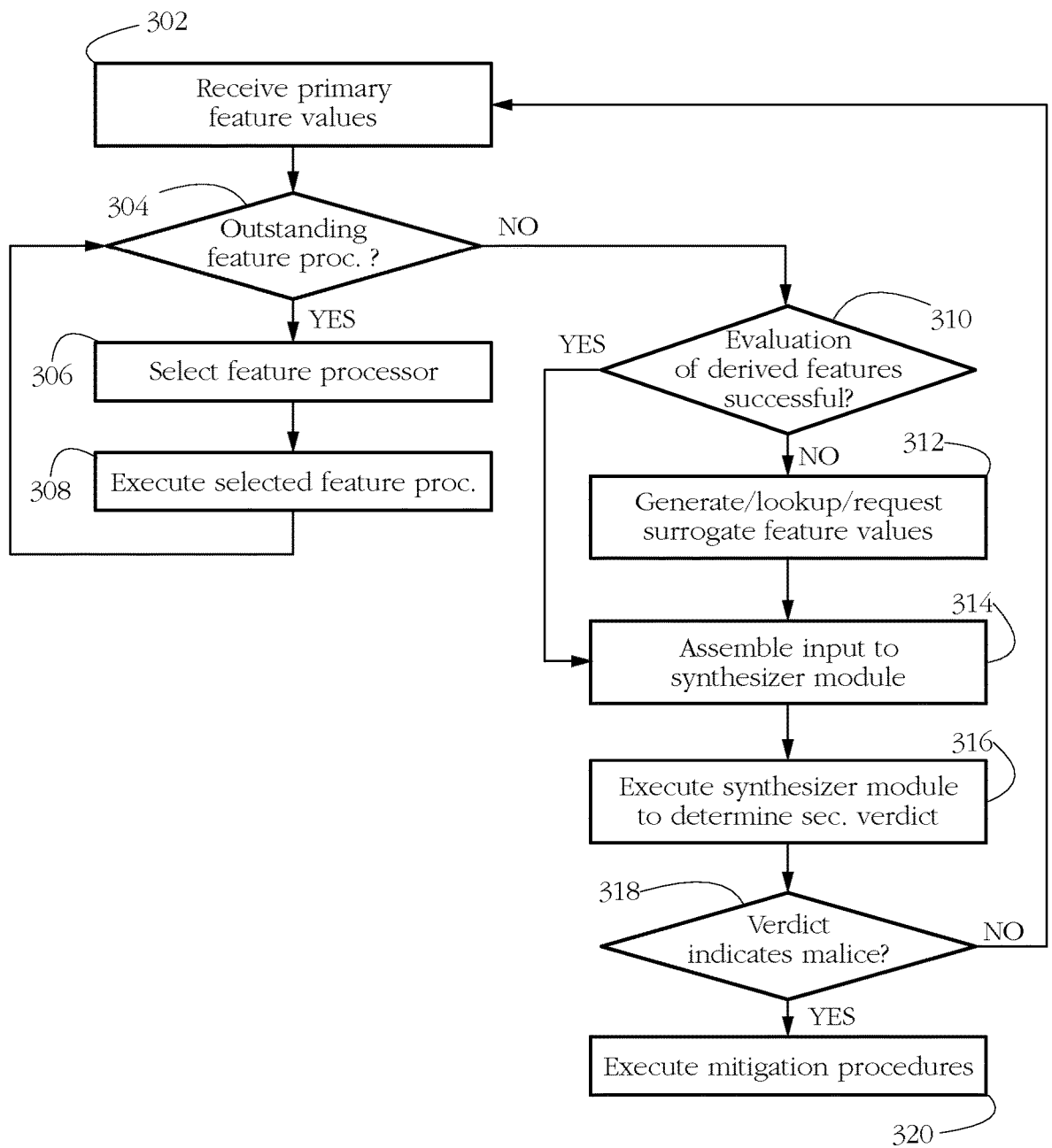
FIG. 3 shows an exemplary sequence of steps performed by the malware detector according to some embodiments of the present invention.

FIG. 3 shows an exemplary sequence of steps performed by malware detector 34 according to some embodiments of the present invention. In some embodiments, feature extractor 32 may continuously evaluate primary features. Alternatively, the operation of extractor 32 may be started by pre-determined trigger events, such as a launch of target application 24, a suspicious or malware-indicative activity, or upon detecting a period of user inactivity, for instance. In yet other embodiments, feature extractor 32 may attempt to evaluate various primary features at pre-determined times, for instance according to a schedule or periodically. In any such case, malware detector 34 may receive a set of primary feature values 40 (a step 302) from feature extractor 32.

In response, detector 34 may attempt to execute feature processors 36a-d to compute the respective derived feature values. In a sequence of steps 304-306-308, all feature processors are selected and executed. When detector 34 comprises multiple layers of feature processors (see e.g., FIG. 8 and associated description below), all levels may be executed progressively, each feature processor receiving input from other feature processors upstream. In some embodiments, each feature processor may execute independently and asynchronously, for instance in a parallel computing configuration. For instance, client device 12 may maintain a pool of processor threads reserved for feature processing; in such embodiments, malware detector 34 may wait until a thread becomes available and assign the respective thread to an outstanding feature processor, which in turn will release the respective thread upon completing its job.

A step 310 may check whether the calculation of derived feature values 44 was successful, or stated otherwise, whether the output of the respective FP is available. The respective FP may fail to produce an output for instance because at least one of the primary feature values required as input to a respective feature processor is currently not available, or because the respective FP has crashed. In response to a failure to compute at least one derived feature value, in a step 312 data substitution module 37 may supply a surrogate value to replace the respective missing derived feature value. In various embodiments as described below, supplying a surrogate value may encompass locally generating, looking up, and/or requesting the respective value from a remote service.

In some embodiments, module 37 may be configured to generate a surrogate feature value according to prior knowledge about the respective derived feature. In one such example using a variant of Gaussian data regression, data previously harvested from client and/or test devices is used to compute various statistics such as typical bounds, a mean, and a standard deviation of each derived feature. The respective statistics may then be transmitted to each client device or instance of malware detector 34, which may then generate surrogate values having the required statistics. The Gaussian distribution is herein given as an example and is not meant to be limiting. Some embodiments may fit the harvested data to other distributions (e.g., Student's distribution, multi-modal distributions, etc.). Other embodiments may use a clustering algorithms such as k-means to distribute data harvested from client and/or test devices into sets of clusters, wherein each cluster may be defined by a characteristic set of parameters such as a centroid and a radius. Such cluster parameters may be transmitted to each client device or instance of malware detector 34, which may then determine surrogate data according to the respective cluster parameters. In one such example, module 37 may generate a random surrogate value according to whether the respective value is closer to a cluster's centroid than the respective cluster's radius. In another example, module 37 may select a cluster's centroid coordinates as surrogate values.

In some embodiments, step 312 may include formulating a query to database 20 and/or to a remote security server and receiving a surrogate feature value in response. The respective surrogate value(s) may be pre-computed according to previous observations and/or to data harvested from other client devices and/or test devices, as further described below.

In some embodiments, data substitution module 37 may look-up/request a surrogate value according to a current state of client device 12. The device state may include, among others, an indicator of a device type, make, and model, an indicator of a type and version of OS 22, identifiers of various software currently installed and/or executing on device 12 (e.g., identifiers of target apps 24), etc. Other query criteria may include a current location (e.g. geolocation, network domain) of client device 12. Alternatively or additionally, in step 312 module 37 may formulate a query/request according to current values of a subset of primary features, for instance at least some of the primary features used in computing the respective missing derived feature value. In one such example using the illustration in FIG. 2, a request for a surrogate value for derived feature $D_2$ may explicitly include or otherwise be formulated according to current values of primary features $F_4$, $F_6$, $F_9$, and $F_{12}$.

In some embodiments as described above, database 20 stores multiple records indexed according to device state and/or other criteria, which enables a selective retrieval of relevant surrogate feature values. Occasionally, a query may return multiple matching values for the respective type of feature. For instance, there may be multiple database records that partially match the device state parameters of the respective query. When multiple surrogate values are available for a selected derived feature, in step 312 module 37 may select one according to a pre-determined criterion. For instance, some embodiments may compute an average or a median of the available surrogate values, or may select the largest or smallest of the available surrogates.

In a step 314 (FIG. 3), detector 34 may assemble an input for synthesizer module 38, for instance an input array 46 as illustrated in FIG. 2, wherein array 46 consists of derived feature values 44 arranged in a pre-determined order and supplemented with surrogate data wherever the respective derived feature values are missing/could not be computed. In the example in FIG. 2, surrogate feature values 42 fill in for the missing values of derived features $D_2$, $D_3$, and $D_4$. In some embodiments, array 46 may further include other malware-indicative data, e.g., primary feature values, quantities computed according to derived feature values and possibly other data, etc.

A further step 316 may execute synthesizer module 38 to determine security verdict 26 according to input array 46. When verdict 26 does not indicate the presence of malware, some embodiments of detector 34 return to step 302, for instance to execute another cycle of malware detection calculations. Otherwise, in a step 320, some embodiments may execute some malware mitigation procedures, such as notifying a user or administrator of the respective device, suspending execution of software suspected of malice (e.g., target app 24), etc. An exemplary warning displayed to the user may include a hyperlink to an online description of the respective malware agent and instructions for recovering from its effects (e.g., instructions for removing the respective malicious application, changing various operating system settings, etc.).

Some embodiments may further transmit a report to a remote security server, for instance comprising indicators of a current device state of client device 12 and/or a set of primary and/or derived feature values that were used in calculating verdict 26. Such reports may be analyzed and used to keep up with evolving threats and to develop new anti-malware tools and strategies.

The embodiments described above mostly include 'self-sufficient' client devices that execute their own local instance of detector 34 and store an instance of security database 20 on local computer-readable media. However, a skilled artisan will know that such configurations are only exemplary and are not meant to be limiting. In alternative embodiments, detector 34 may execute on a remote server and may communicate with client device 12 via messages compliant with a client-server protocol. In one such example illustrated in FIG. 4, multiple client devices 12a-d are connected to a communication network 15, which may include a local area network (e.g., home network, corporate network, etc.), a wide-area network and/or the Internet. Network 15 generically represents a set of hardware (physical layer) and software interfaces enabling the transfer of data between devices 12a-d and other entities connected to network 15.

Figure 4:
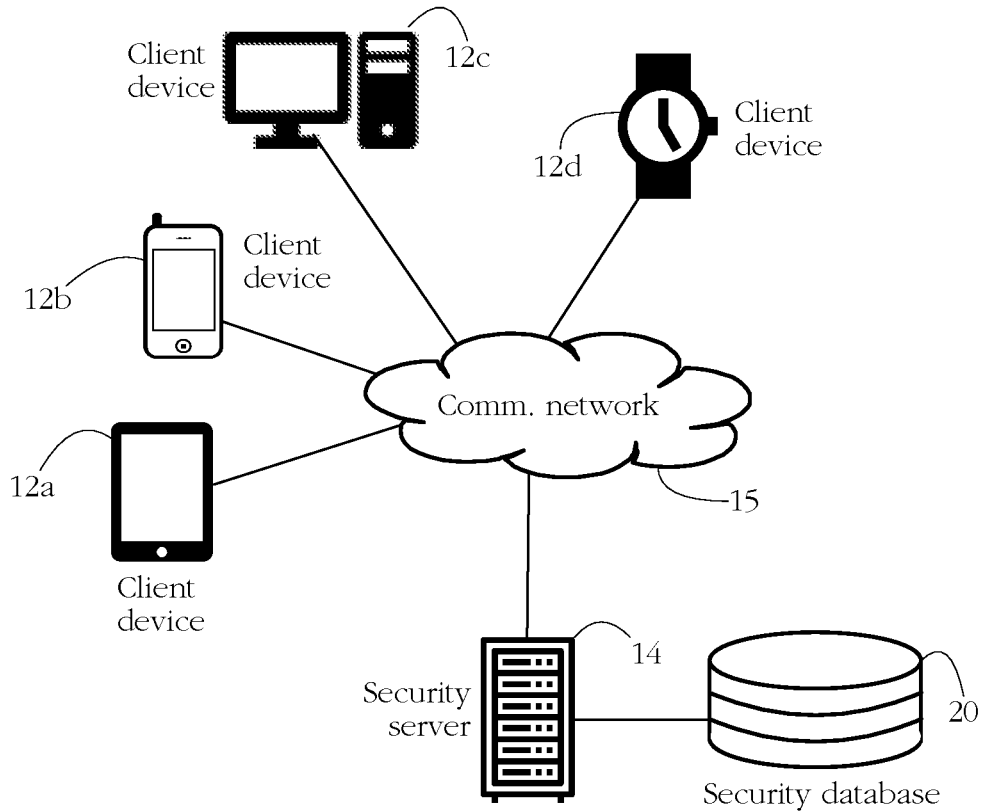
FIG. 4 shows a plurality of client devices protected from malware by a security server according to some embodiments of the present invention.
Figure 5:
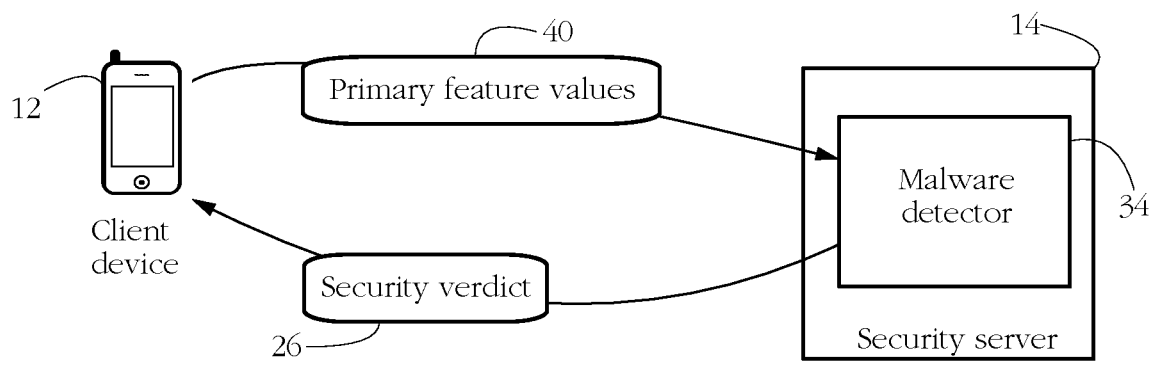
FIG. 5 shows an exemplary data exchange between a selected client device and the security server according to some embodiments of the present invention.

FIG. 4 further shows a security server 14 connected to communication network 15. Server 14 generically represents a set of communicatively coupled computer systems, which may or may not be in physical proximity to each other. In some embodiments as further illustrated in FIG. 5, server 14 protects all client devices 12a-d against malware by receiving primary feature values 40 from each client, executing malware detector 34 to compute a respective security verdict, and returning verdict 26 to the respective client.

Figure 6:
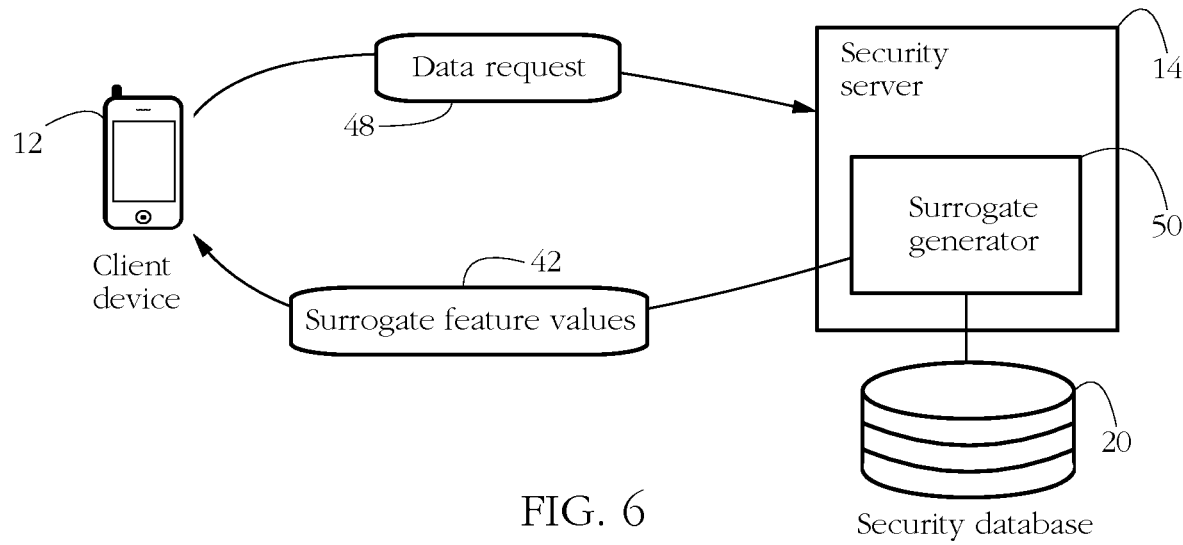
FIG. 6 shows another exemplary data exchange between the client device and the security server according to some embodiments of the present invention.

In yet another alternative embodiment illustrated in FIG. 6, instead of hosting a repository of surrogate feature values locally, client device 12 may request surrogates from security server 14. In turn, server 14 may execute a surrogate generator 50 configured to maintain a centralized version of security database 20 comprising surrogate feature values indexed according to device state or other criteria as described above. Configurations as illustrated in FIG. 6 may be preferable to the one illustrated in FIG. 1 because they avoid transferring a content of database 20 to each protected client, and because a centralized system is typically quicker to respond to emerging threats. However, client-server communications required for operating in such configurations may substantially slow down the operation of client-side malware detectors 34.

FIG. 6 further illustrates an exemplary exchange wherein client 12 transmits a data request 48 to server 14 and in response receives surrogate values 42. Data request 48 may be formulated to enable a selective retrieval of surrogates, for instance according to feature type of the respective feature, according to a device type and/or to a current device state of the respective client, and/or according to other criteria such as a current location (geolocation, network domain, etc.) of the respective client. In some such embodiments, data request 48 may include device state data of client 12 and/or a set of primary feature values 40.

In some embodiments, data request 48 may include a client identifier enabling server 14 to associate client 12 to a client-specific account or service agreement, which may indicate various client-specific security settings such as an acceptable rate of false positives, for instance. The respective client identifier may further be associated with device type data characterizing the respective client device 12, such as a device type, make, and model, a type and version of OS 22, a list of applications currently installed on device 12, etc. Some embodiments of server 14 may then use such information to customize retrieval of surrogate data for the respective client device.

Figure 7:
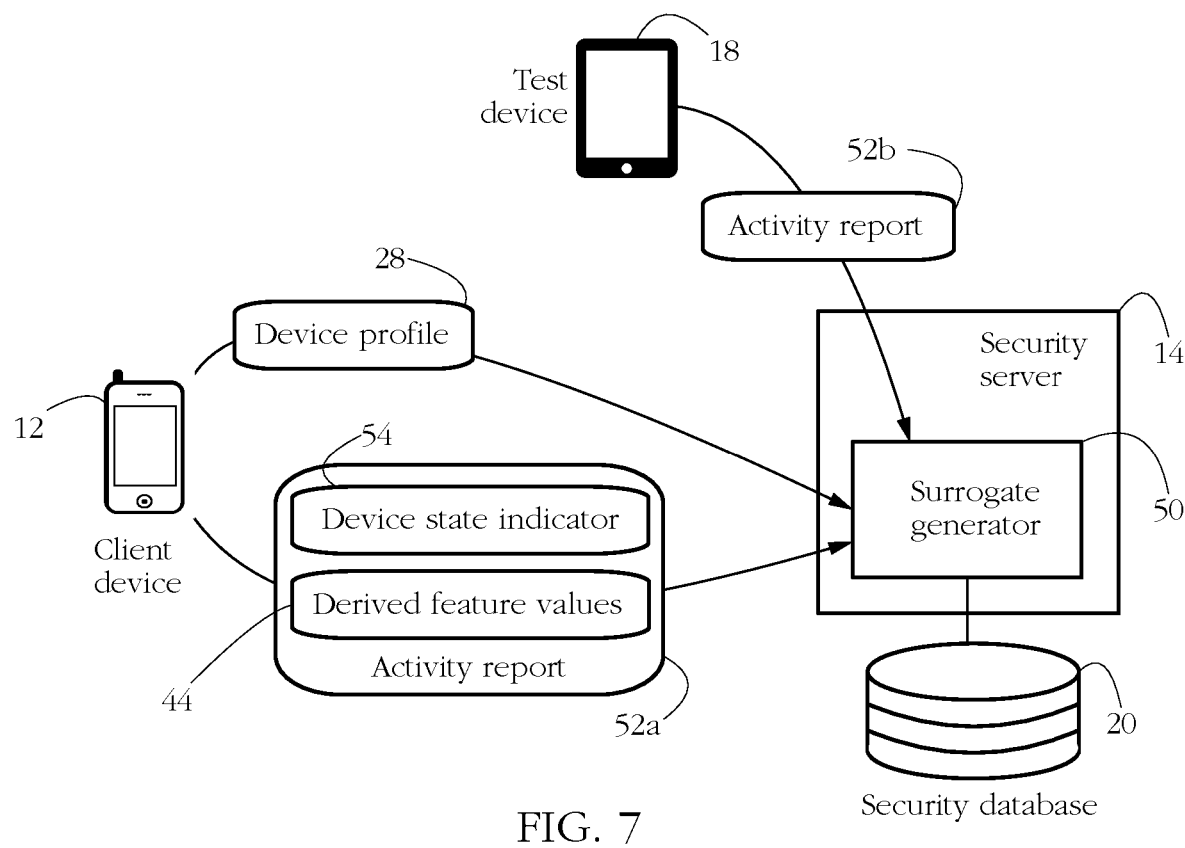
FIG. 7 shows a plurality of devices providing data to a surrogate generator according to some embodiments of the present invention.

FIG. 7 illustrates an exemplary process of generating surrogate feature values according to some embodiments of the present invention. In one exemplary strategy, security server 14 may harvest derived feature values 44 computed remotely by protected client devices 12a-e, to then use as surrogate values for delivery to requesting clients. To further enable an association between feature values 44 and device state, in some embodiments clients further pair a set of values 44 with a device state indicator 54 indicative of a device state under which values 44 were calculated. For instance, state indicator 54 may include a set of primary feature values 40 used in calculating derived feature values 44. In one exemplary embodiment as illustrated in FIG. 6, state indicator 54 and feature values 44 are bundled together in an activity report 52a, which may be transmitted by client device 12 according to a schedule or in response to a malware-detection procedure as described above in relation to FIG. 3.

Server 14 may further receive a device profile 28 from each client, including a client identifier and a set of data characterizing a hardware and/or software configuration of the respective client (e.g., device type, make, model, OS version, various current settings, etc.). Server 14 may then use such information in associating harvested feature values 44 with a specific device type and/or configuration.

Alternatively or additionally, some embodiments employ a set of test devices 18 to compute derived feature values 44 in various hardware and software configurations. In some embodiments, test device 18 comprises an instance of a mobile computing device such as a smartphone or a tablet computer, device 18 acting as a substitute for a protected client. One example of test device 18 consists of a physical appliance, e.g., a mobile phone of a specific make and model, having a specific hardware and/or software configuration and communicatively coupled to security server 14. Another example of test device 18 comprises an emulation of a physical device, i.e., a set of software modules that reproduce the behavior of a real, physical appliance such as a smartphone. In one such example, various software components of test device 18 execute in a sandbox (isolated container). In other exemplary embodiments, test device 18 may include a virtual machine or comprising an abstraction/virtualization of a respective client device, the virtual machine capable of executing an operating system, a set of target applications and a security application as described above in relation to FIG. 1. Some test devices 18 may operate as a web service, e.g., as part of a device farm. Several such services are available commercially.

In some such embodiments, server 14 may remotely configure test device 18 with specific hardware and software characteristics and may remotely trigger an execution of a malware detector on the respective device. Some such tests may explore the behavior of test device 18 when executing various target applications, some benign, some known to be malicious. As a result of the respective execution, server 14 may harvest a set of derived feature values computed by test device 18, for instance in the form of an activity report 52b further including associated device state and/or other data. Some embodiments may then index, annotate, and store collected derived feature data in security database 20, to be further transmitted as surrogate values 42 to requesting clients.

Database 20 may be formatted and stored according to any standard known in the art. Exemplary database formats include a relational database, an extensible markup language (XML) document, a spreadsheet, and a key-value store, among others. Server 14 and/or client devices may be configured to selectively retrieve and/or insert data into database 20, for instance using structured queries.

By collecting a large volume of data from protected clients and/or test devices, server 14 may further determine reliable statistics of each derived feature $D_i$, for instance typical values and/or typical ranges of each feature. Server 14 may fit various types of statistical distributions (e.g., Gaussian regression) to the collected data and thus determine other statistical characteristics such as a mean value, standard deviation, expectation values, etc. Such data may then be used by some embodiments of malware detector 34 to generate surrogate values 42 with similar characteristics on demand.

Figure 8:
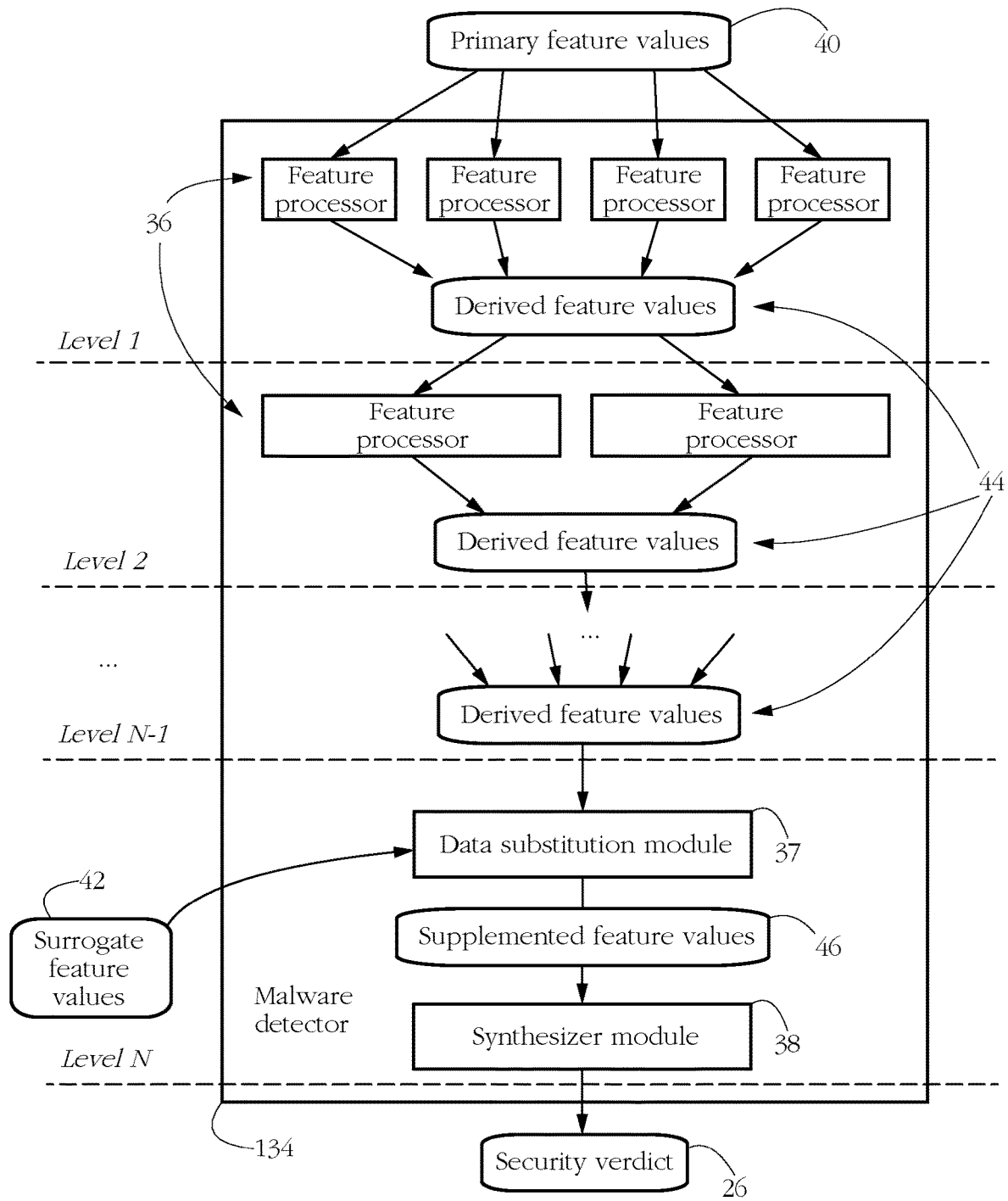
FIG. 8 shows a generic multi-level stacked malware detector according to some embodiments of the present invention.

The exemplary malware detector 34 illustrated in FIG. 2 comprises just two layers, wherein a first layer of feature processors 36a-d feeds into a second layer consisting of synthesizer module 38. However, a skilled artisan will know that the systems and methods described above can be adapted to a stacked malware detector having more than two layers. FIG. 8 shows an exemplary malware detector 134 according to some embodiments of the present invention, detector 134 consisting of a stack/cascade of N layers, each layer i comprising a set of feature processors 36 that take input from the layer i-1 upstream and compute a set of derived feature values 44 according to the respective input. The respective derived feature values are then passed as input to the next layer (i+1) of feature processors 36. The type and count of feature processors 36 may vary among layers, as illustrated. In one exemplary embodiment, each feature processor 36 comprises a separate pre-trained artificial neural network. Feature processors in layer 1 take primary feature values 40 as input. At the other end of the cascade, the output of layer N-1 is fed as input to synthesizer module 38, which in turn outputs security verdict 26.

When some of primary feature values 40 are missing, some feature processors 36 that depend on the respective input cannot execute and therefore, some derived feature values 44 may be missing as well. In such cases, data substitution module 37 fills in the missing derived feature values with surrogate values 42, to produce a complete input array 46 for synthesized module 38. Such supplementation with surrogates may be done at any level of the cascade from 1 to N-1. However, preferred embodiments as illustrated in FIG. 8 supply surrogate values 42 only to the output of the N-1 layer.

Figure 9:
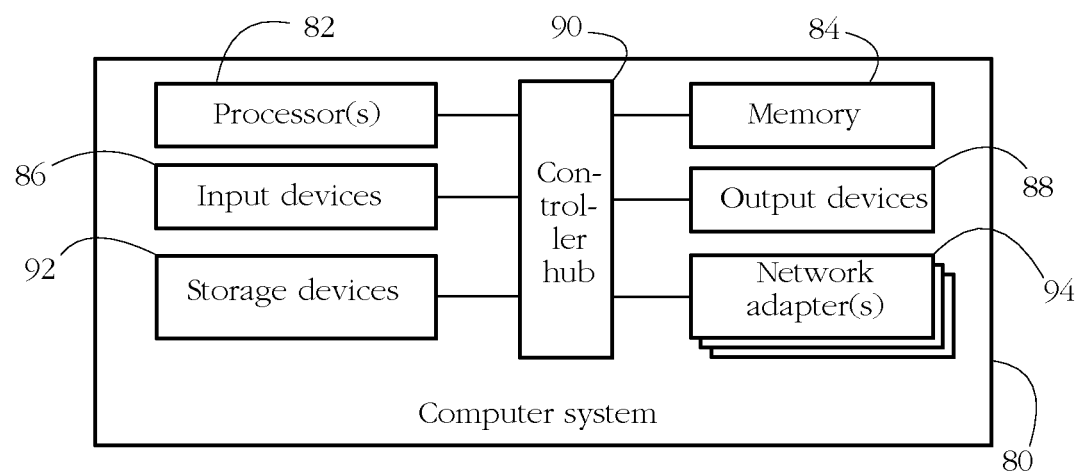
FIG. 9 shows an exemplary hardware configuration of a computer system programmed to perform some of the methods described herein.

The description above shows various methods and algorithms which may be embodied as computer programs executed by a general-purpose hardware processor, but a skilled artisan will understand that the respective functionality may also be implemented using dedicated hardware components, such as an application-specific integrated circuit (ASIC) or field-programmable gate array (FPGA), or using a combination of hardware and software. FIG. 9 illustrates an exemplary hardware configuration of a computer system 80 programmable to carry some of the methods and algorithms described herein. The illustrated configuration is generic and may represent any of client devices 12a-d and/or security server 14. An artisan will know that the hardware configuration of some types of devices (e.g., mobile telephones, smartwatches, servers, routers) may differ somewhat from the one illustrated in FIG. 9.

The illustrated computer system comprises a set of physical devices, including a hardware processor 82 and a memory unit 84. Processor 82 comprises a physical device (e.g., a microprocessor, a multi-core integrated circuit formed on a semiconductor substrate, etc.) configured to execute computational and/or logical operations with a set of signals and/or data. In some embodiments, such operations are specified to processor 82 in the form of a sequence of processor instructions (e.g., machine code) encoding an algorithm for carrying out some of the methods described herein. Memory unit 84 may comprise volatile computer-readable media (e.g., DRAM, SRAM) storing instructions and/or data accessed or generated by processor 82.

Input devices 86 may include computer keyboards, mice, and microphones, among others, including the respective hardware interfaces and/or adapters allowing a user to introduce data and/or instructions into the respective computer system. Output devices 88 may include display devices such as monitors and speakers among others, as well as hardware interfaces/adapters such as graphic cards, allowing the illustrated computing appliance to communicate data to a user. In some embodiments, input devices 86 and output devices 88 share a common piece of hardware, as in the case of touch-screen devices. Storage devices 92 include computer-readable media enabling the non-volatile storage, reading, and writing of software instructions and/or data. Exemplary storage devices 92 include magnetic and optical disks and flash memory devices, as well as removable media such as CD and/or DVD disks and drives. The set of network adapters 94, together with associated communication interface(s), enable the illustrated computer system to connect to communication network 15 (FIG. 4) and/or to other devices/computer systems. Controller hub 90 generically represents the plurality of system, peripheral, and/or chipset buses, and/or all other circuitry enabling the communication between processor 82 and devices 84, 86, 88, 92, and 94. For instance, controller hub 90 may include a memory controller, an input/output (I/O) controller, and an interrupt controller, among others. In another example, controller hub 90 may comprise a northbridge connecting processor 82 to memory 84, and/or a southbridge connecting processor 82 to devices 86, 88, 92, and 94.

The exemplary systems and methods described above enable protecting electronic devices and their users against malicious software. Some of the described methods and systems are particularly suited to mobile computing devices such as smartphones, tablet computers, and wearable computers, among others. Such mobile devices typically have substantially less computing power, memory, and storage than other computer systems such as personal computers and servers, and therefore may present specific challenges to the conventional computer security paradigm.

Some conventional anti-malware software analyzes the code (e.g., memory image) of a program, looking for patterns or snippets that are known to be malicious. Other conventional anti-malware methods include monitoring the behavior of software by detecting the occurrence of selected events and applying a set of rules and/or calculations to the detected events to determine to whether the respective device is infected. Recent developments in machine learning have enabled an effective analysis of data using artificial neural networks. In typical examples of such technologies, a set of neural networks is configured to analyze an array of features characterizing the target software and determine whether the respective software is malicious. The neural networks are pre-trained on a corpus including known malicious as well as benign samples. In some cases, the number of input features may be very large (several hundred to thousands of distinct features, including static and behavioral features as described above).

However, evaluating such features may not be technically straightforward, especially on mobile computing devices such as smartphones and other wearable computing devices. Computations required for both inspecting the memory and observing the behavior of an application may consume substantial resources and thus negatively impact user experience. Some event-detection methods such as hooking various OS functions may not be available on all operating systems and device types. Furthermore, evaluating some features may necessitate particular OS settings, for instance specific permissions which may not be granted on all devices. Some features may not be available at all times or in all locations. Therefore, applying some conventional anti-malware methods described above on mobile computing platforms may be impractical.

Some embodiments of the present invention explicitly address such shortcomings, thereby enhancing the security of mobile computing devices. In some embodiments, a feature extractor attempts to evaluate a plurality of features characterizing the hardware and software of a client device. A set of resulting primary feature values are then fed to a plurality of feature processors, arranged in a multi-level cascade wherein each level receives input from the next level upstream, and in turn provides input to a next level downstream (see exemplary architectures in FIGS. 2 and 8). At the last level of the stack of feature processors, a synthesizer module outputs a security verdict indicative of whether the respective client device comprises malicious software.

In some embodiments, each feature processor comprises a set of pre-trained neural to networks configured to input a subset of derived feature values available at the respective level of the cascade. In a simple example constructed as illustrated in FIG. 2, each feature processor may comprise a neural network configured to determine whether the respective client comprises malware according to a distinct subset of primary feature values. Stated otherwise, each feature processor may assess the target software from a distinct 'viewpoint', i.e., according to distinct criteria, and produce a distinct verdict. To use an analogy from image processing, each feature processor may analyze a distinct aspect of an image (i.e., a set of primary feature values) to determine whether the respective image shows a particular object (e.g., a bicycle): one feature processor may consider edge information, while another may consider image segmentation data. The independent assessments may then be brought together by the synthesizer module, thus producing a unified assessment of the primary feature data.

Some conventional malware detectors feed the whole set of primary feature values to a single neural network. In contrast, some embodiments of the present invention divide the input among multiple, smaller feature processors/neural networks as described above. The advantages of such division are at least twofold. First, the computational cost of training and running neural networks typically scales with the square of the size of the input, and therefore smaller networks may be substantially cheaper to train and use than large ones. This may be especially true for anti-malware activities, wherein successful detection may require analyzing hundreds or thousands of distinct input parameters.

Second, some primary feature values may not always be available, for any of the reasons outlined above. Architectures which rely on a single neural network configured to consider all features of the input data may thus fail whenever at least one of the required features is missing. In contrast, dividing the input data among multiple smaller feature processors/networks as described herein allows executing at least those feature processors whose input is available.

Some embodiments of the present invention further supply surrogate data to fill in for missing feature values. However, instead of replacing any missing primary feature values, in some embodiments surrogate data is used to replace derived feature values which could not be computed because of the missing primary feature values. Stated otherwise, in some embodiments of the present invention, supplementation with surrogates is done at intermediate levels of the feature processor cascade. In preferred embodiments, surrogate feature values are provided as input to the synthesizer module (see e.g., FIGS. 1 and 8), to ensure that the respective module can always execute.

This choice is deliberate and has substantial advantages over other strategies of mitigating missing input. Some embodiments rely on the observation that feature processors such as neural networks provide an important dimensionality reduction. Stated otherwise, the size of the output of typical feature processors may be orders of magnitude smaller than the size of their input. In the exemplary embodiment illustrated in FIG. 2, feature processor 36a inputs six primary feature values and outputs just one derived feature value $D_1$. This means that the count of derived feature values 44 is generally expected to decrease down a cascade of stacked feature processors as illustrated in FIG. 8. The typical input to synthesizer module 38 may be 20-30 elements long, while the size of primary feature vector 40 may be in the hundreds or thousands.

Therefore, solving a missing input problem according to some embodiments of the present invention may only require supplying a modest number of surrogate feature values 42. In contrast, solving the problem at the primary feature level may require supplying a much larger number of missing values, some of which may be difficult or impractical to determine. Furthermore, supplying surrogates at an intermediate or final level (as opposed to a primary level) of the feature processor stack/cascade removes the computational burden of actually executing the feature processors that normally compute the feature values that are now supplied as surrogates.

Some embodiments further rely on the observation that derived feature values 44 (i.e., feature values determined at intermediate levels of the FP stack/cascade) typically have substantially less variability than primary feature values 40. This follows from a generic tendency of neural networks to infer and generalize. In one exemplary embodiment, one feature processor 36 may be trained to analyze a webpage currently displayed on a screen of client device 12, to determine whether the respective webpage is an e-banking interface. Since the look and functionality of such interfaces varies substantially from one banking institution to another, there is substantially more variability in the input than in the output of the respective FP. Providing surrogate input at primary feature level would require generating a surrogate webpage/HTML document, which is substantially more computationally costly than providing surrogate output (i.e., banking or no banking).

Some embodiments use as surrogates reference values of each derived feature, said reference values determined by other protected client devices and/or by test devices having similar hardware and/or software configurations as the client executing the respective instance of malware detector. Such reference values may be centrally harvested by a security server computer system and provided on demand to requesting clients. Other embodiments use such data harvested from clients and/or test devices to determine various statistics (mean, standard deviation, etc.) of each derived feature, and then generate random surrogate data according to the determined statistics.

It will be clear to one skilled in the art that the above embodiments may be altered in many ways without departing from the scope of the invention. Accordingly, the scope of the invention should be determined by the following claims and their legal equivalents.

What is claimed is:

1. A malware detection method comprising employing at least one hardware processor of a computer system to:
 determine a plurality of primary feature values characterizing a software entity executing on the computer system;
 execute a plurality of feature processors to determine a plurality of derived feature values according to the plurality of primary feature values, wherein a selected feature processor of the plurality of feature processors is configured to determine a selected derived feature value according to a selected subset of the plurality of primary feature values;
 supply a surrogate value to replace a missing derived feature value in response to a failure to determine the missing derived feature value; and
 determine whether the software entity is malicious according to the plurality of derived feature values and further according to the surrogate value.

2. The method of claim 1, wherein the selected derived feature value indicates a likelihood that the software entity is malicious.

3. The method of claim 1, wherein supplying the surrogate value comprises employing the at least one hardware processor to calculate the surrogate value according to a reference value determined by another feature processor executing on a device distinct from the computer system.

4. The method of claim 3, wherein supplying the surrogate value comprises calculating the surrogate value according to a statistic of a plurality of reference values, the plurality of reference values determined by other feature processors executing on devices distinct from the computer system.

5. The method of claim 1, wherein supplying the surrogate value comprises selectively retrieving the surrogate value from a database storing a plurality of reference values determined by other feature processors executing on devices distinct from the computer system.

6. The method of claim 5, comprising selecting the surrogate value from the plurality of reference values according to a current state of the computer system.

7. The method of claim 5, comprising selecting the surrogate value from the plurality of reference values according to a device type of the computer system.

8. The method of claim 1, wherein supplying the surrogate value comprises:
 employing the at least one hardware processor of the computer system to transmit a data request to a remote security server, the data request formulated according to an indicator of a current state of the computer system; and
 in response to transmitting the data request, receiving the surrogate value from the remote security server.

9. The method of claim 8, wherein the data request includes at least one value of the plurality of primary feature values.

10. The method of claim 1, wherein each feature processor of the plurality of feature processors comprises a neural network trained to determine a likelihood that the software entity is malicious according to a respective subset of the plurality of primary feature values.

11. A computer system having at least one hardware processor configured to execute:
 a feature extractor configured to determine a plurality of primary feature values characterizing a software entity executing on the computer system;
 a plurality of feature processors configured to determine a plurality of derived feature values according to the plurality of primary feature values, wherein a selected feature processor of the plurality of feature processors is configured to determine a selected derived feature value according to a selected subset of the plurality of primary feature values;
 a data substitution module connected to the plurality of feature processors and configured to,
  supply a surrogate value to replace a missing derived feature value in response to a failure to determine the missing derived feature value; and
 a synthesizer module configured to determine whether the software entity is malicious according to the plurality of derived feature and further according to the surrogate value.

12. The computer system of claim 11, wherein the selected derived feature value indicates a likelihood that the software entity is malicious.

13. The computer system of claim 11, wherein supplying the surrogate value comprises employing the at least one hardware processor to calculate the surrogate value according to a reference value determined by another feature processor executing on a device distinct from the computer system.

14. The computer system of claim 13, wherein supplying the surrogate value comprises calculating the surrogate value according to a statistic of a plurality of reference values, the plurality of reference values determined by other feature processors executing on devices distinct from the computer system.

15. The computer system of claim 11, wherein supplying the surrogate value comprises selectively retrieving the surrogate value from a database storing a plurality of reference values determined by other feature processors executing on devices distinct from the computer system.

16. The computer system of claim 15, wherein the data substitution module is configured to select the surrogate value from the plurality of reference values according to a current state of the computer system.

17. The computer system of claim 15, wherein the data substitution module is configured to select the surrogate value from the plurality of reference values according to a device type of the computer system.

18. The computer system of claim 11, wherein supplying the surrogate value comprises:
 transmitting a data request to a remote security server, the data request formulated according to an indicator of a current state of the computer system; and
 in response to transmitting the data request, receiving the surrogate value from the remote security server.

19. The computer system of claim 18, wherein the data request includes at least one value of the plurality of primary feature values.

20. The computer system of claim 11, wherein each feature processor of the plurality of feature processors comprises a neural network trained to determine a likelihood that the software entity is malicious according to a respective subset of the plurality of primary feature values.

21. A non-transitory computer-readable medium storing instructions which, when executed by at least one hardware processor of a computer system, cause the computer system to perform malware detection comprising:
 determining a plurality of primary feature values characterizing a software entity executing on the computer system;
 executing a plurality of feature processors to determine a plurality of derived feature values according to a plurality of primary feature values, wherein a selected feature processor of the plurality of feature processors is configured to determine a selected derived feature value according to a selected subset of the plurality of primary feature values;

supplying a surrogate value to replace a missing derived feature value in response to a failure to determine the missing derived feature value; and determining whether the software entity is malicious according to the plurality of derived feature values and further according to the surrogate value.

* * * * *